United States Patent
Liu et al.

(10) Patent No.: US 9,297,518 B2
(45) Date of Patent: Mar. 29, 2016

(54) BACKLIGHT MODULE

(71) Applicants: Hung-Wei Liu, Hsin-Chu (TW); Chin-Ku Liu, Hsin-Chu (TW)

(72) Inventors: Hung-Wei Liu, Hsin-Chu (TW); Chin-Ku Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 424 days.

(21) Appl. No.: 13/871,007

(22) Filed: Apr. 26, 2013

(65) Prior Publication Data

US 2013/0301240 A1   Nov. 14, 2013

(30) Foreign Application Priority Data

May 11, 2012   (TW) .............. 101116926 A

(51) Int. Cl.
   *F21V 13/04*   (2006.01)
   *F21V 8/00*   (2006.01)
   *G02F 1/1335*   (2006.01)
   *G02B 19/00*   (2006.01)

(52) U.S. Cl.
   CPC ............... *F21V 13/04* (2013.01); *G02B 6/003* (2013.01); *G02B 6/0096* (2013.01); *G02B 19/0028* (2013.01); *G02B 19/0061* (2013.01); *G02F 1/133615* (2013.01); *G02B 6/0053* (2013.01); *G02B 6/0055* (2013.01)

(58) Field of Classification Search
   CPC ... G02F 1/133615; F21V 13/04; G02B 6/003; G02B 6/0096; G02B 19/0028; G02B 19/0061
   See application file for complete search history.

(56) References Cited

U.S. PATENT DOCUMENTS

| | | | |
|---|---|---|---|
| 5,757,557 A | 5/1998 | Medvedev et al. | |
| 7,556,415 B2 * | 7/2009 | Hamada | G02B 6/0068 362/231 |
| 2002/0080615 A1 * | 6/2002 | Marshall | F21V 5/04 362/333 |
| 2005/0243578 A1 | 11/2005 | Lee et al. | |

(Continued)

FOREIGN PATENT DOCUMENTS

| | | |
|---|---|---|
| CN | 101435952 | 5/2009 |
| CN | 102434823 | 5/2012 |

(Continued)

OTHER PUBLICATIONS

"Office Action of Taiwan Counterpart Application", issued on Jun. 23, 2014, p. 1-p. 9, in which the listed references were cited.

(Continued)

*Primary Examiner* — Mary Ellen Bowman
(74) *Attorney, Agent, or Firm* — Jianq Chyun IP Office

(57) ABSTRACT

A backlight module including a chamber, a bottom reflector, a plurality of light sources, and a plurality of lenses is provided. The chamber has a bottom surface and a side surface. The bottom reflector is disposed inside the chamber and located on the bottom surface. The light sources are disposed inside the chamber and located above the bottom reflector. Each light source is adjacent to the side surface and provides light. The lenses are disposed on a transmission path of the light. Each lens has a back surface, a cavity on the back surface, and a light-emitting surface. The cavity has a light-incident surface. Each light source is arranged corresponding to one of the lenses and adjacent to the cavity. The light, after passing the lenses, is divided into light beams with different propagating directions. The light beams irradiate the bottom reflector.

24 Claims, 15 Drawing Sheets

(56) References Cited

U.S. PATENT DOCUMENTS

| | | | |
|---|---|---|---|
| 2007/0147036 A1* | 6/2007 | Sakai | G02B 6/0096 362/240 |
| 2010/0059767 A1* | 3/2010 | Kawasaki | G02F 1/133615 257/89 |

FOREIGN PATENT DOCUMENTS

| | | |
|---|---|---|
| JP | 2000122055 | 4/2000 |
| JP | 2002032029 | 1/2002 |
| JP | 2005129409 | 5/2005 |
| TW | 588804 | 5/2004 |
| TW | I263099 | 10/2006 |
| TW | M319426 | 9/2007 |
| TW | 200817777 | 4/2008 |
| TW | 201003245 | 1/2010 |
| TW | 201020642 | 6/2010 |
| TW | 201202614 | 1/2012 |

OTHER PUBLICATIONS

"Office Action of China Counterpart Application," issued on Jan. 16, 2015, p. 1-p. 7, in which the listed references were cited.

* cited by examiner

BACKLIGHT MODULE

CROSS-REFERENCE TO RELATED APPLICATION

This application claims the priority benefit of Taiwan application serial no. 101116926, filed on May 11, 2012. The entirety of the above-mentioned patent application is hereby incorporated by reference herein and made a part of this specification.

BACKGROUND OF THE INVENTION

1. Field of the Invention

The invention generally relates to a planar light source, and more particularly, to a backlight module.

2. Description of Related Art

With rapid progress in display techniques, flat panel displays have become the mainstream among various displays and have replaced conventional cathode ray tube (CRT) displays. Among various flat panel displays, liquid crystal displays (LCD) have gained most popularity from consumers. A normal LCD is mainly included a backlight module and an LCD panel. Since the LCD panel does not emit light by itself, the backlight module is required for generating light to perform display functions.

In general, a conventional backlight module may be categorized into a direct-type backlight module and an edge-type backlight module. In an exemplary edge-type backlight module, light provided by a light source is transmitted within a light guide plate (LGP) due to the total reflection of light in the LGP, and the total reflection of light is destroyed by scattering patterns or microstructures located at the bottom of the LGP, such that the light is allowed to be evenly emitted from a light-emitting surface of the LGP.

Nonetheless, the edge-type backlight module equipped with the LGP still needs improvement. For instance, scratches or residual particles that cause bright spots or dark areas in the backlight module are inevitably formed during assembly of the LGP, which may reduce the yield rate. Besides, with the increasing in the dimension of the display, the size of the LGP needs to be correspondingly increased, and thus the large-size LGP may encounter issues of the increasing manufacturing costs, overweight, and so forth.

Hence, it is rather imperative for manufacturers to reduce the manufacturing costs and the weight of the backlight module thereof.

SUMMARY OF THE INVENTION

The invention is directed to a backlight module that is capable of decreasing the probability of using a LGP and providing favorable luminance in a normal direction.

Other objectives and advantages of the invention should be further comprehended from the technical features disclosed in the invention.

To achieve one of, a part of or all of the above-mentioned objectives, or to achieve other objectives, an embodiment of the invention provides a backlight module that includes a chamber, a bottom reflector, a plurality of light sources, and a plurality of lenses. The chamber has a bottom surface and a side surface. The bottom reflector is disposed inside the chamber and located on the bottom surface. The light sources are disposed inside the chamber and located above the bottom reflector, and the light sources are adjacent to the side surface. Each of the light sources is suitable for providing light. The lenses are disposed on a transmission path of the light. Each of the lenses has a back surface, a cavity on the back surface, and a light-emitting surface. The cavity has a light-incident surface. Each of the light sources is arranged corresponding to one of the lenses and adjacent to the cavity. The light, after passing the lenses, is divided into a plurality of light beams with different propagating directions, and the light beams irradiate the bottom reflector.

According to an embodiment of the invention, parts of the propagating directions are parallel to an optical axis of the light sources, and the other of the propagating directions are not parallel to the optical axis of the light sources.

According to an embodiment of the invention, each of the lenses respectively corresponds to more than one of the light sources.

According to an embodiment of the invention, each of the lenses respectively corresponds to one of the light sources.

According to an embodiment of the invention, a plurality of irradiation regions on the bottom reflector are irradiated by the light beams with the different propagating directions respectively, and the irradiation regions are overlapped.

According to an embodiment of the invention, an optical axis of the light sources is located on a reference plane. After the light emitted from each of the light sources passes the lenses, parts of the propagating directions are parallel to the reference plane, and the other of the propagating directions are not parallel to the reference plane.

According to an embodiment of the invention, each of the lenses includes a first part and a second part. The first part converges one portion of the light to provide one of the light beams, and the second part reflects and converges the other portion of the light to provide the other light beams.

According to an embodiment of the invention, each of the lenses includes a first part, a second part, and a third part. The first part converges one portion of the light to provide a first light beam, the second part reflects and converges another portion of the light to provide a second light beam, and the third art reflects and converges the other portion of the light to provide a third light beam.

According to an embodiment of the invention, the light beams irradiate the bottom reflector in a tilted manner.

According to an embodiment of the invention, a thickness of the bottom reflector at a center of the chamber is greater than a thickness of the bottom reflector away from the center of the chamber.

According to an embodiment of the invention, the bottom reflector has a curved surface, and a curvature radius of the curved surface at the center of the chamber is less than a curvature radius of the curved surface away from the center of the chamber.

According to an embodiment of the invention, a tilt angle is between the side surface and each of the lenses respectively corresponding to one of the light sources.

According to an embodiment of the invention, the tilt angle is approximately $\tan^{-1}(h_0/w_0)$, the chamber has a height and a width, $h_0$ is the height of the chamber, and $w_0$ is half of the width of the chamber.

According to an embodiment of the invention, a first row of the light sources and a second row of the light sources are configured on the side surface along a height direction of the chamber, and the first row of the light sources is located above the second row of the light sources.

According to an embodiment of the invention, the first row of the light sources and the second row of the light sources respectively irradiate an irradiation region of the bottom reflector, and the irradiation region where the first row of the light sources irradiates is farther away from the side surface than the irradiation region where the second row of the light sources irradiates.

According to an embodiment of the invention, the lenses corresponding to the first row of the light sources are different from the lenses corresponding to the second row of the light sources.

According to an embodiment of the invention, the first row of the light sources has a first optical axis, and the second row of the light sources has a second optical axis. The back surface and the light-emitting surface of each of the lenses corresponding to the first row of the light sources are symmetrical with respect to the first optical axis, and the back surface and the light-emitting surface of each of the lenses corresponding to the second row of the light sources are not symmetrical with respect to the second optical axis.

According to an embodiment of the invention, the backlight module further includes a side reflector, and an edge of the side reflector and an edge of the bottom reflector are adjoined to surround the light sources and the lenses.

According to an embodiment of the invention, the side reflector is a mirror reflector.

According to an embodiment of the invention, the backlight module further includes a top reflector disposed above the bottom reflector to cover the light sources and the lenses, and the top reflector defines a light-emitting opening.

According to an embodiment of the invention, the backlight module further includes a diffusion sheet disposed over the bottom reflector.

According to an embodiment of the invention, the diffusion sheet of the backlight module includes a curved surface protruding toward the chamber.

According to an embodiment of the invention, the chamber has a light-emitting surface opposite to the bottom surface, and the diffusion sheet located above the bottom reflector is disposed adjacent to the light-emitting surface of the chamber.

According to an embodiment of the invention, the diffusion sheet is disposed over the bottom surface and located on the bottom reflector.

In view of the above, the LGP is not a necessary element in the backlight module described in the embodiments of the invention, and thus the backlight module is competitive in terms of weight and manufacturing costs.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
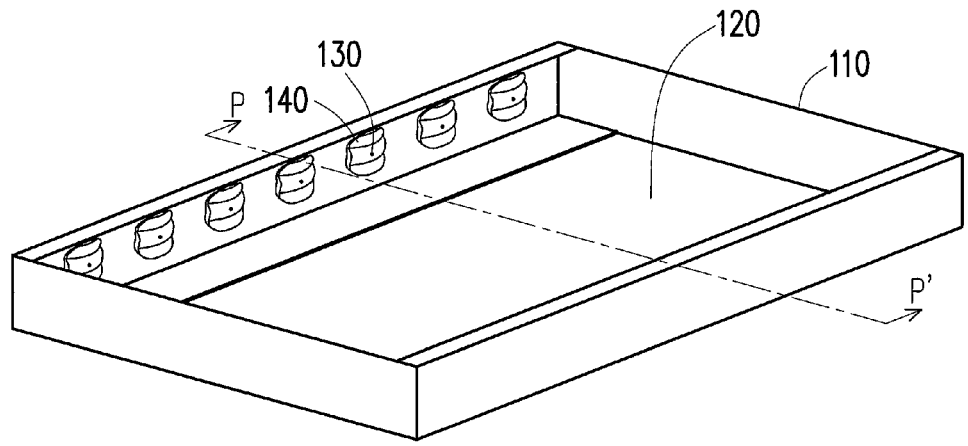
FIG. 1A is a schematic view illustrating a backlight module according to an embodiment of the invention.
Figure 1B:
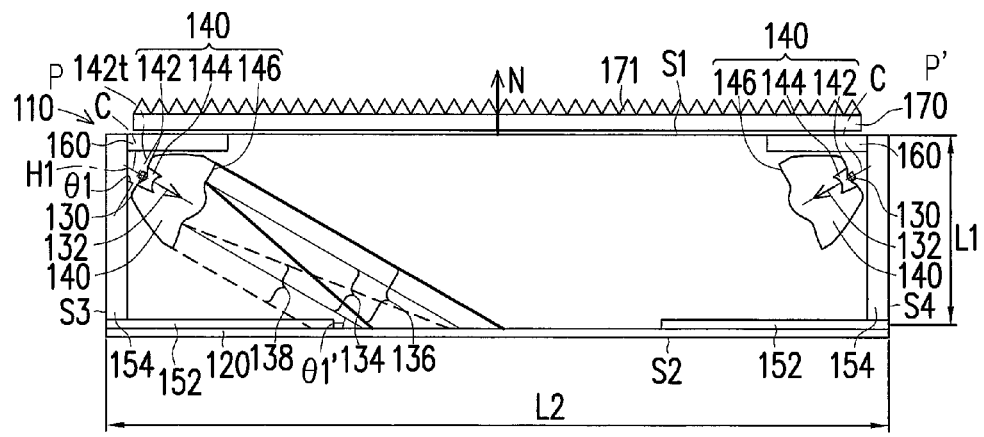
FIG. 1B is a schematic cross-sectional view illustrating the back light module depicted in FIG. 1A along a section line P-P'.

FIG. 1A is a schematic three-dimensional view illustrating a backlight module according to an embodiment of the invention. FIG. 1B is a schematic cross-sectional view illustrating the back light module depicted in FIG. 1A along a section line P-P'. Referring to FIG. 1A and FIG. 1B, the backlight module 100A described in the present embodiment includes a chamber 110, a bottom reflector 120, a plurality of light sources 130, and a plurality of lenses 140. The chamber 110 has a light-emitting surface S1, a bottom surface S2 opposite to the light-emitting surface S1, and a side surface connecting the light-emitting surface S1 and the bottom surface S2. The side surface includes a first side surface S3 and a second side surface S4 that is located opposite to the first side surface S3. The bottom reflector 120 is disposed on the bottom surface S2 in the chamber 110. Plural light sources 130 and plural lenses 140 are exemplarily shown in FIG. 1A and FIG. 1B, while the number of light sources and the number of lenses are not limited in the present embodiment. A person with ordinary skills in the related art may adjust the number of light sources and the number of lenses in the backlight module 100A in order to comply with design requirements of actual products. As illustrated in FIG. 1A and FIG. 1B, the light sources 130 are configured on the first side surface S3 and the second side surface S4, which should however not be construed as a limitation to the invention. In other embodiments, the light sources 130 may be configured only on the first side surface S3 or configured on other side surfaces.

The light sources 130 are suitable for providing light 132. Each of the light sources 130 has an optical axis C, and the light 132 may be substantially emitted from the light source 130 along the optical axis C of the light source 130. The light sources 130 are disposed inside the chamber 110, adjacent to the side surface, and above the bottom reflector 120. The bottom reflector 120 is, for instance, a white reflector. As indicated in FIG. 1B, the light sources 130 are substantially configured on the first side surface S3 and the second side surface S4 of the chamber 110, and each of the light sources 130 corresponds to one of the lenses 140, respectively.

According to the present embodiment, the light source 130 is, for instance, a light-emitting diode (LED) chip configured on a printed circuit board, an LED package, or any other appropriate point light source. Nevertheless, in other embodiments, the light source 130 may be a cold cathode fluorescent lamp (CCFL) or any other appropriate light source.

Referring to FIG. 1B, each of the lenses 140 is disposed on a transmission path of the corresponding light 132. To be specific, the lenses 140 are disposed inside the chamber 110 and located above the bottom reflector 120, and the lenses 140 and the light axes C of the light sources 130 are located on a reference plane H1, wherein each of the lenses 140 has a light-emitting surface 146, a back surface 142, and a cavity 144 formed on the back surface 142. Besides, the light 132 provided by the light source 130 may be divided by the lens 140 into light beams 134, 136, and 138 with different propagating directions, and the light beams 134, 136, and 138 are guided by the lens 140 to the bottom reflector 120, so that the light beams 134, 136, and 138 may be guided by the bottom reflector 120 toward a normal direction of the light-emitting surface S1 (i.e., along a direction parallel to a normal N of the light-emitting surface S1). In FIG. 1B, the light beams 134, 136, and 138 are exemplarily shown, which should however not be construed as a limitation to the invention. According to the present embodiment, a tilt angle θ1 may exist between the lens 140 and the side surface (e.g., the first side surface S3 and/or the second side surface S4) of the chamber 110, wherein the tilt angle θ1 is approximately $\tan^{-1}(h_0/w_0)$, $h_0$ is the height L1 of the chamber 110, and $w_0$ is half of the width L2 of the chamber 110. In the present embodiment shown in FIG. 1B, the width L2 of the chamber 110 is the size of the chamber 110 in a direction perpendicular to the first side surface S3 (i.e., the distance between the first side surface S3 and the second side surface S4 in FIG. 1B). For instance, the height L1 of the chamber 110 is approximately 30 mm, the width L2 is approximately 440 mm (i.e., half of the width L2 is approximately 220 mm), and the tilt angle θ1 is approximately 7.7 degrees. In particular, the tilt angle θ1 is relevant to irradiation regions of the bottom reflector 120 where the light beams 134, 136, and 138 irradiate. That is, an included angle θ1' between the bottom reflector 120 and a light beam (e.g., the light beam 134) substantially parallel to the optical axis C is substantially equal to the tilt angle θ1. Hence, the farther the irradiation region away from the first side surface S3 where the region (wherein the irradiation region on the bottom reflector 120 is irradiated by the light beam parallel to the optical axis C, and the light beam is emitted from the light source 130 disposed on the first side surface S3), the smaller the tile angle θ1 between the lens 140 and the first side surface S3 of the chamber 110. According to the present embodiment, the irradiation regions of the bottom reflector 120 where the light beams (guided by the lens 140) irradiate can be adjusted by monitoring the value of the tile angle θ1, and the light beams may be converged to the center of the bottom reflector 120. Thereby, the backlight module 100A described in the present embodiment may have favorable luminance in the normal direction (the luminance is measured along a direction parallel to the direction of the normal N of the light-emitting surface S1).

Figure 2A:
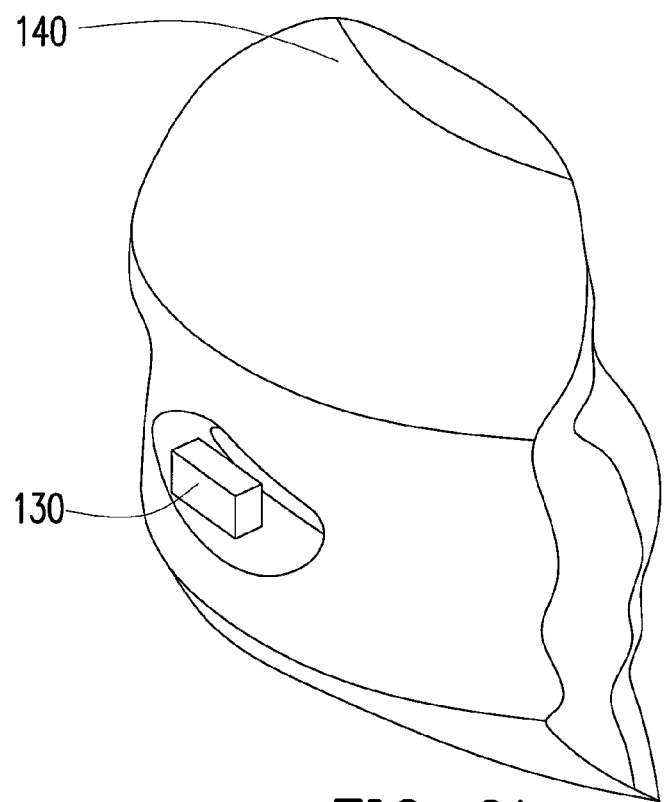
FIG. 2A is a partial enlarged view illustrating the light source and the lens depicted in FIG. 1B.
Figure 2B:
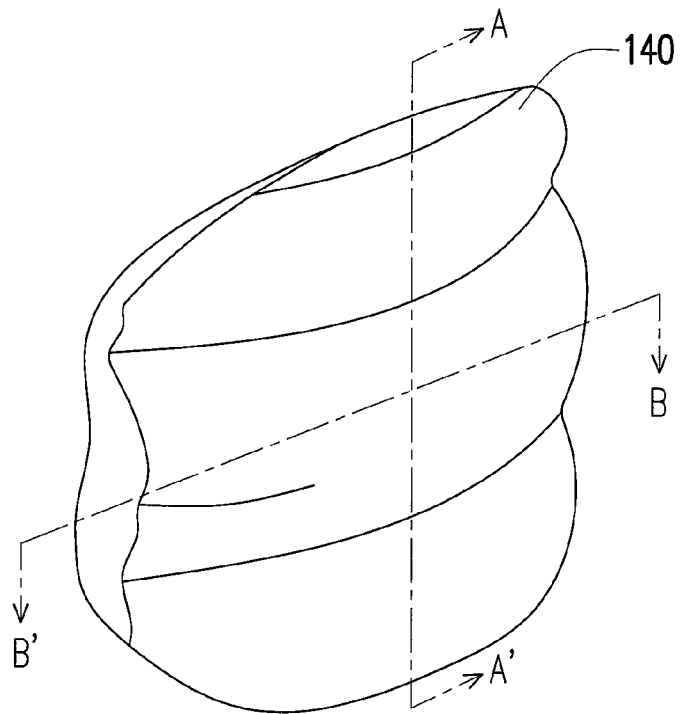
FIG. 2B is a partial enlarged view illustrating the lens depicted in FIG. 2A from another viewing angle.
Figure 3A:
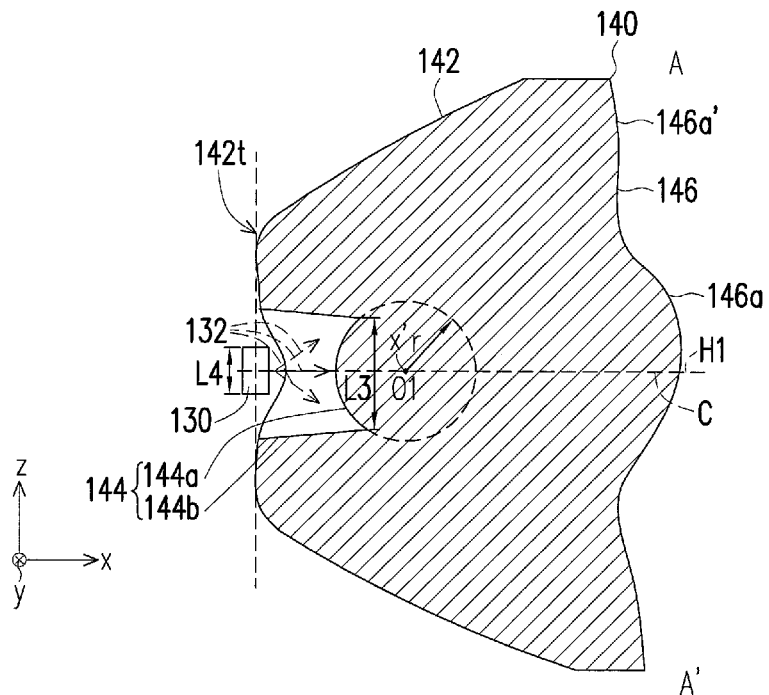
FIG. 3A is a schematic cross-sectional view taken along a section line A-A' depicted in FIG. 2B.
Figure 3B:
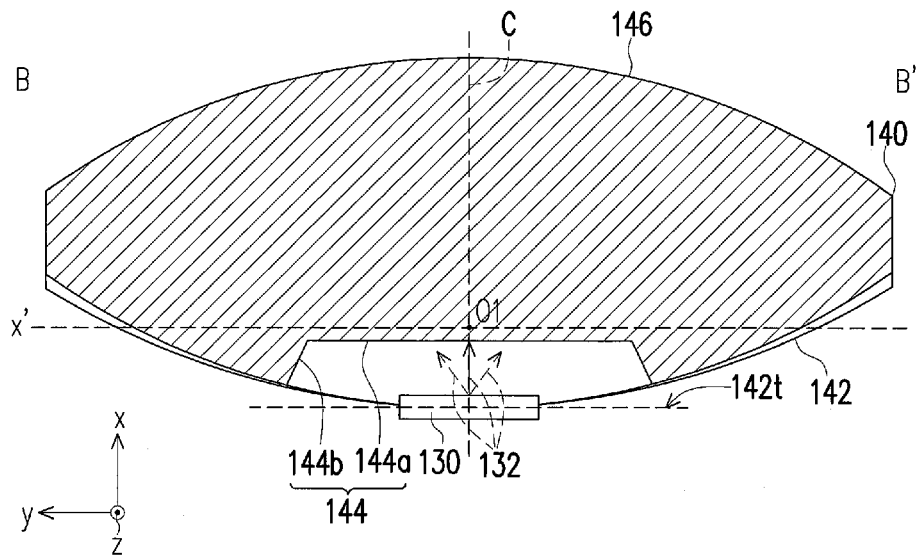
FIG. 3B is a schematic cross-sectional view taken along a section line B-B' depicted in FIG. 2B.

FIG. 2A is a partial enlarged view illustrating the light source and the lens depicted in FIG. 1B. FIG. 2B is a partial enlarged view illustrating the light source and the lens depicted in FIG. 2A from another viewing angle. FIG. 3A is a schematic cross-sectional view illustrating the light source and the lens depicted in FIG. 2B along a section line A-A'. FIG. 3B is a schematic cross-sectional view illustrating the light source and the lens depicted in FIG. 2B along a section line B-B'. In order to explain the structural directions of the light source and the lens, a coordinate graph is defined in FIG. 3A and FIG. 3B. The coordinate graph includes the x-axis, the y-axis, and the z-axis perpendicular to one another. The x-axis is substantially parallel to the optical axis C of the light source 130, the x-y plane is substantially parallel to the reference plane H1, and the y-z plane is substantially parallel to a portion of the tangent plane 142t that is located on the back surface 142 and adjacent to the light source 130. The tangent plane 142t is tangential to the back surface 142, and a normal (not shown) of the tangent plane 142t is substantially parallel to the optical axis C.

Referring to FIG. 3A and FIG. 3B, the back surface 142 and the light-emitting surface 146 may be free-form surfaces or parabolic surfaces. In the embodiment shown in FIG. 3A and FIG. 3B, the light-emitting surface 146 of the lens 140 may be shaped as an octagon if observed along the optical axis C. As shown in FIG. 3A, the back surface 142 extends from the tangent plane 142t toward the light-emitting surface 146 and is away from the reference plane H1, wherein the back surface 142 substantially has a taper shape. In comparison with the reference plane H1, the tangent plane 142t is substantially closer to the back surface 142. The light-emitting surface 146a adjacent to the reference plane H1 protrudes toward a direction away from the tangent plane 142t. The light-emitting surface 146a' away from the reference plane H1, compared with the protruding light-emitting surface 146a of the light-emitting surface 146, is closer to the tangent plane 142t in the x-axis direction. Additionally, as shown in FIG. 3B, the closer the back surface 142 to the optical axis C, the closer the back surface 142 to the tangent plane 142t. The light-emitting surface 146 is a parabolic surface protruding toward the direction away from the tangent plane 142t, and the protruding direction of the light-emitting surface 146 substantially corresponds to the cavity 144. As shown in FIG. 3A and FIG. 3B, the cavity 144 has a light-incident surface that includes a first light-incident surface 144a and a second light-incident surface 144b. The light beam emitted from the light source 130 enters the lens 140 through the first light-incident surface 144a and the second light-incident surface 144b. The first light-incident surface 144a is located in front of the light source 130, and the second light-incident surface 144b is a side surface of the cavity 144. In the present embodiment, the first light-incident surface 144a may be a pillar-shaped surface, and the second light-incident surface 144b may be an elliptic-conical surface. An axis x' of the pillar-shaped surface (the first light-incident surface 144a) and the optical axis C may be intersected at a point O1, and the pillar-shaped surface has a curvature radius r that is greater than the half height L3 of the cavity 144, wherein the height L3 refers to the length of an intersection of the first and second light-incident surfaces 144a and 144b on the x-z plane. In the present embodiment, the height L3 of the cavity 144 is approximately 2~3 times the height L4 of the light source 130, the curvature radius r is approximately 1.6~2 times the height L4 of the light source 130, and the height L4 is the maximum length of the light source 130 along the z-axis. According to the present embodiment, the height L3 is the minimum height of the cavity 144. The cone axis (not shown) of the elliptic-conical surface on the second light-incident surface 144b is substantially located on the optical axis C. In the present embodiment, the first light-incident surface 144a may be a pillar-shaped surface, and the second light-incident surface 144b may be an elliptic-conical surface. The geometric shapes collocating with each other allow the cavity 144 to improve the light-incident efficiency of light 132 entering the lens 140. Through the design of the back surface 142 and the light-emitting surface 146 shown in FIG. 3B, the lens 140 described in the present embodiment is capable of converging the light 132 in form of beams. Besides, through the design of the back surface 142 and the light-emitting surface 146 shown in FIG. 3A, the light beams of the light 132 converged by the lens 140 and the bottom reflector 120 (shown in FIG. 1B) may be sufficiently overlapped. In an embodiment of the invention, through the curvature design of the back surface 142 and the light-emitting surface 146, the convergence ability of light 132 in the vertical direction (i.e., the z-axis) shown in FIG. 3A is greater than the convergence ability of light 132 in the horizontal direction (i.e., the y-axis) shown in FIG. 3B. Thereby, the light beams transmitted to the bottom reflector (shown in FIG. 1B) may be uniformized through the lens 140 described in the present embodiment.

Figure 4A:
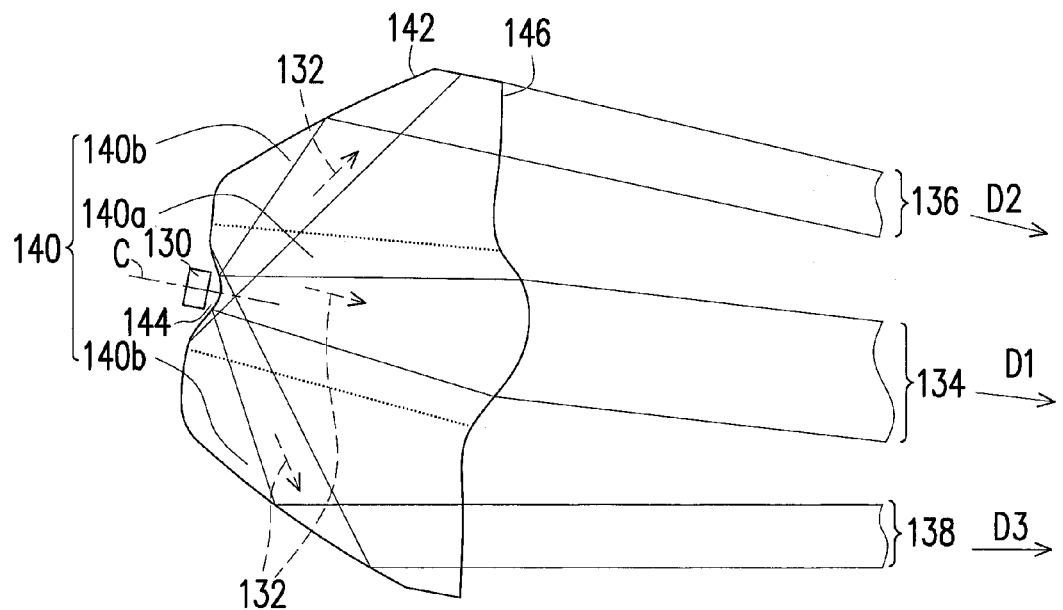
FIG. 4A is a schematic view illustrating light transmission within the lens depicted in FIG. 3A.

FIG. 4A is a schematic view illustrating light transmission within the lens 140 depicted in FIG. 2A. Referring to FIG. 4A, the lens 140 of the embodiment is collocated with the back surface 142, the cavity 144, and the light-emitting surface 146 by which the light 132 emitted from the light source 130 may be divided into a plurality of light beams 134, 136, and 138 with propagating directions D1~D3. The propagating directions D1~D3 may be different, wherein the propagating direction D1 may be substantially parallel to the optical axis C while the other propagating directions D2 and D3 may not be substantially parallel to the optical axis C. Herein, the light beams 134, 136, and 138 and the corresponding propagating directions D1~D3 serve as an example for elaborating the present embodiment, which should however not be construed as a limitation to the invention.

Particularly, the lens 140 described in the present embodiment may include a first part 140a and a second part 140b. As shown in FIG. 4A, dotted lines are applied to distinguish the first part 140a from the second part 140b. The first part 140a converges one portion of the light 132 to provide a portion of the light beam 134, and the second part 140b reflects and converges the other portion of the light 132 to provide the light beams 136 and 138. The light beam 134 is substantially transmitted along the propagating direction D1, and the propagating direction D1 is substantially parallel to the optical axis C of the light source 130. The light beam 136 is substantially transmitted along the propagating direction D2, the light beam 138 is substantially transmitted along the propagating direction D3, and the propagating directions D2 and D3 are not substantially parallel to the optical axis C of the light source 130.

Figure 4B:
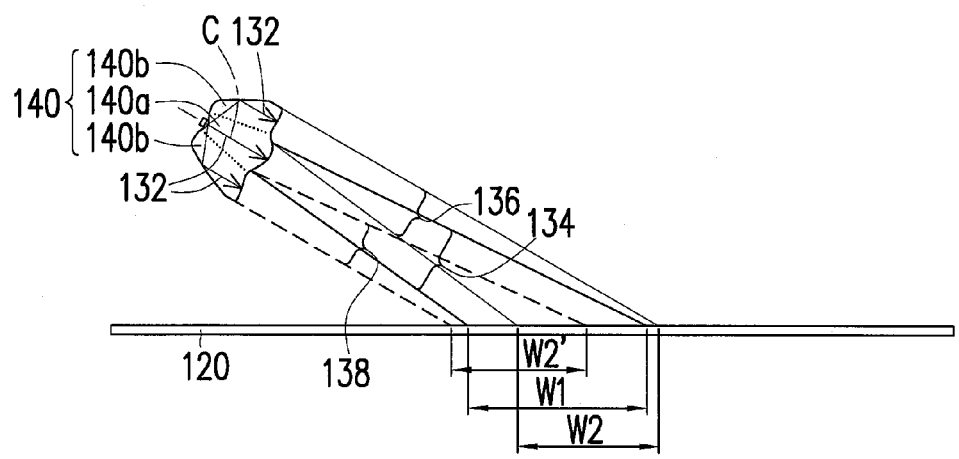
FIG. 4B is a schematic view illustrating that light beams depicted in FIG. 4A are transmitted to a bottom reflector.

FIG. 4B is a schematic view illustrating that light beams depicted in FIG. 4A are transmitted to the bottom reflector 120. Referring to FIG. 4B, the irradiation regions w1, w2, and w2' of the bottom reflector 120 where the light beams 134, 136, and 138 with the different propagating directions respectively irradiate are overlapped. Specifically, the first part 140a of the lens 140 converges one portion of the light 132 to provide the light beam 134 substantially parallel to the optical axis C, and the irradiation region w1 refers to the location where the light beam 134 irradiates on the bottom reflector 120. The second part 140b of the lens 140 converges the other portion of the light 132 to provide the light beams 136 and 138 that are not substantially parallel to the optical axis C, and the irradiation regions w2 and w2' refer to the locations where the light beams 136 and 138 irradiate on the bottom reflector 120. Besides, through adjusting the curvature of the back surface 142, the cavity 144, and the light-emitting surface 146 (shown in FIG. 4A) of the lens 140, the first part 140a and the second part 140b of the lens 140 in the present embodiment may converge the light 132 to different degrees, such that the irradiation regions w1, w2, and w2' of the bottom reflector 120 where the light beams 134, 136, and 138 respectively irradiate are sufficiently overlapped. Thereby, the backlight module 100A is capable of providing uniform luminance in a normal direction.

To ensure the favorable luminance of the backlight module 100A in the normal direction, as indicated in FIG. 1B, side reflectors 152 and 154 may be selectively disposed in the chamber 110 of the backlight module 100A described in the present embodiment, wherein the edges of the side reflectors 152 and 154 and an edge of the bottom reflector 120 are adjoined to surround the light sources 130 and the lenses 140. It should be mentioned that the side reflectors 152 and 154 surrounding the light sources 130 and the lenses 140 may not entirely encircle the light sources 130 and the lenses 140, i.e., it is not necessary for the side reflectors 152 and 154 to surround all sides of the light sources 130 and the lenses 140. As shown in FIG. 1B, as long as the side reflectors 152 and 154 are located behind and below the light sources 130 and lenses 140, the side reflectors 152 and 154 are deemed to surround the light sources 130 and lenses 140. In the present embodiment, the side reflector 152 may be disposed on the bottom surface S2, and the side reflector 154 may be disposed on the side surface of the chamber 110. As described in the embodiment shown in FIG. 1B, the side reflector 154 may be disposed on the first side surface S3 and the second side surface S4, wherein the side reflectors 152 and 154 are mirror reflectors with specular reflection property, e.g., silver reflectors. According to the embodiment shown in FIG. 1B, the light sources 130 are disposed adjacent to the first side surface S3 and the second side surface S4, and the light adjacent to the first and second side surfaces S3 and S4 is apt to encounter scatter reflection, such that the edge of the light-emitting surface S1 is relatively bright. If the side reflectors 152 and 154 are configured, the light 132 is less likely to encounter scatter reflection at the first and second side surfaces S3 and S4 of the chamber 110, and the edge of the light-emitting surface S1 of the backlight module 100A would not be overly bright. Thereby, the backlight module 100A is capable of providing favorable luminance. In the embodiment shown in FIG. 1B, the light sources 130 are configured on the first side surface S3 and the second side surface S4, and thus the side reflector 154 may be configured on the first side surface S3 and the second side surface S4. In other embodiments of the invention, if the light sources 130 are merely disposed adjacent to the first side surface S3, the side reflector 154 may also be only configured adjacent to the first side surface S3.

From another perspective, the backlight module 100A described in the present embodiment as shown in FIG. 1B may selectively include a top reflector 160 disposed above the bottom reflector 120 to cover the light sources 130 and the lenses 140, and the top reflector 160 defines a light-emitting opening of the backlight module 100A. According to the present embodiment, the top reflector 160 may be disposed on the light-emitting surface S1 and substantially located between the lenses 140 and the light-emitting surface S1. Herein, the top reflector 160 is, for instance, a white reflector or a silver reflector. The top reflector 160 may prevent the first side surface S3 and the second side surface S4 of the backlight module 100A from being overly bright (when the light sources 130 are disposed on the first side surface S3 and the second side surface S4), so as to improve the light-emitting uniformity of the light 132 from the light-emitting surface S1. A diffusion sheet 170 may also be selectively disposed on the top reflector 160 in the chamber 110, so as to further enhance uniformity of the light 132 emitted from the light-emitting surface S1. The diffusion sheet 170 may be disposed with a plurality of micro-structures 171 that are cone-shaped structures, prism-shaped structures, or pillar-shaped structures. These micro-structures 171 may further enhance the luminance of the backlight module 100A in the normal direction as well as control the uniformity of the luminance in the normal direction.

Figure 5:
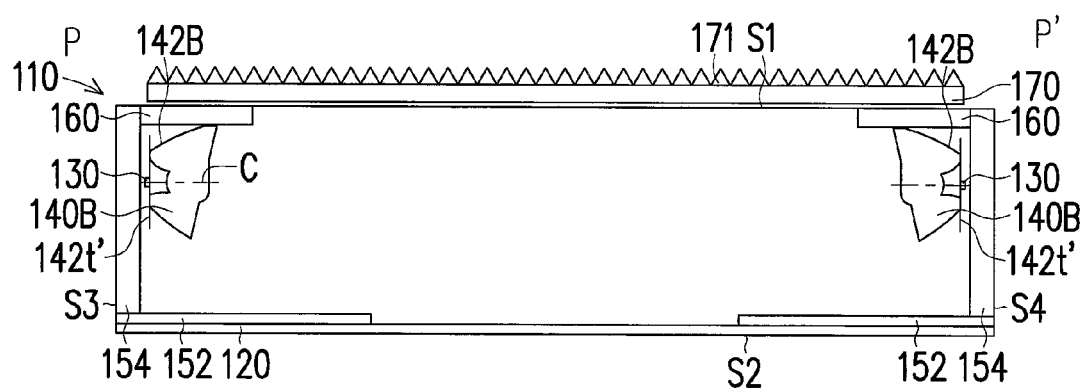
FIG. 5 is a schematic cross-sectional view illustrating a backlight module according to another embodiment of the invention.

FIG. 5 is a schematic cross-sectional view illustrating a backlight module according to another embodiment of the invention. Referring to FIG. 5, the backlight module 100B described in the present embodiment is similar to the backlight module 100A depicted in FIG. 1A, while the difference therebetween lies in that there is substantially no tilt angle between the lenses 140B and the first and second side surfaces S3 and S4 of the chamber 110. Namely, the tangent plane 142$t'$ that is located on the back surface 142B of the lens 140B is substantially parallel to the first side surface S3 and the second side surface S4. The tangent plane 142$t'$ is tangential to the back surface 142B adjacent to the light source 130, and the normal (not shown) of the tangent plane 142$t'$ is substantially parallel to the optical axis C.

Figure 6A:
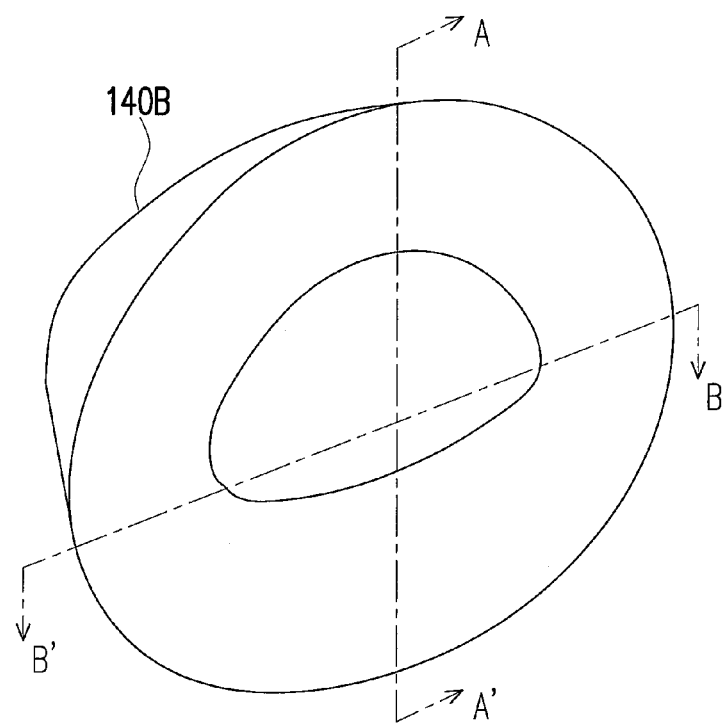
FIG. 6A is a partial enlarged view illustrating the lens depicted in FIG. 5.
Figure 6B:
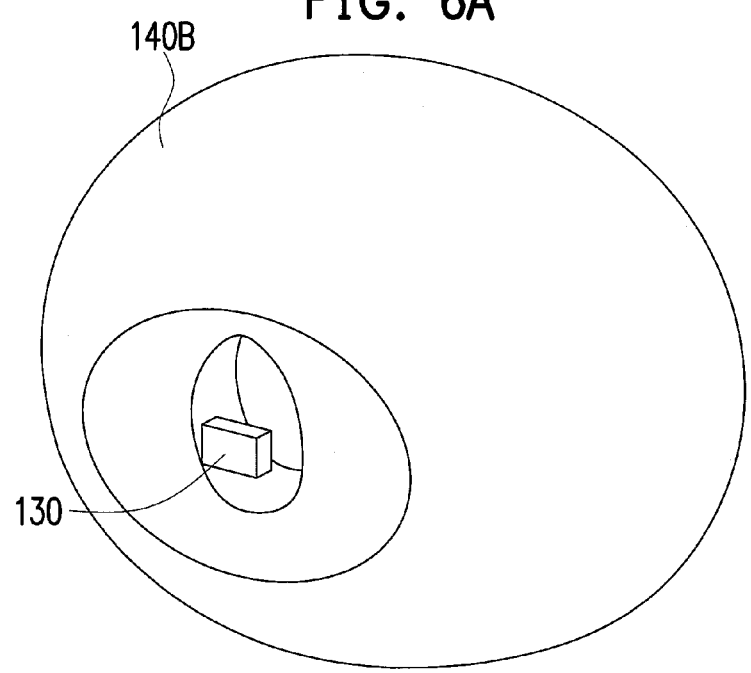
FIG. 6B is a partial enlarged view illustrating the light source and the lens depicted in FIG. 2A from another viewing angle.
Figure 7A:
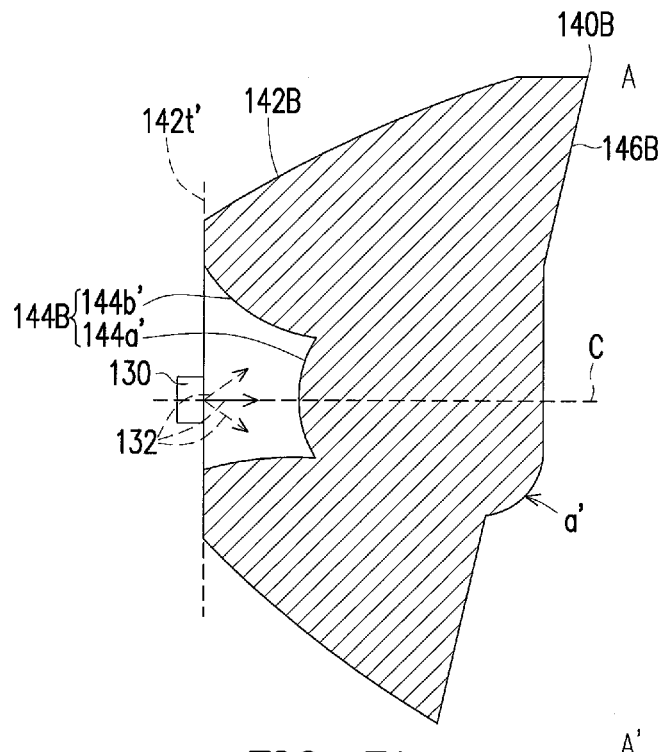
FIG. 7A is a schematic cross-sectional view taken along a section line A-A' depicted in FIG. 6A.
Figure 7B:
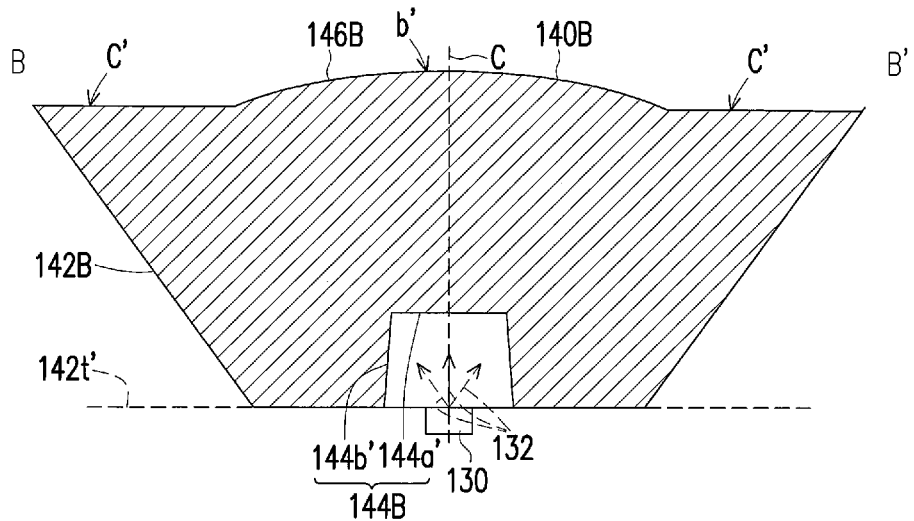
FIG. 7B is a schematic cross-sectional view taken along a section line B-B' depicted in FIG. 6A.

FIG. 6A is a partial enlarged view illustrating the lens 140B depicted in FIG. 5. FIG. 6B is a partial enlarged view illustrating the light source 130 and the lens 140B depicted in FIG. 5 from another viewing angle. FIG. 7A is a schematic cross-sectional view taken along a section line A-A' depicted in FIG. 6A. FIG. 7B is a schematic cross-sectional view taken along a section line B-B' depicted in FIG. 6A.

As shown in FIG. 7A, the lens 140B at two sides of the optical axis C has an asymmetric structure. Herein, the back surface 142B, the light-emitting surface 146B, and the first and second light-incident surfaces 144$a'$ and 144$b'$ of the cavity 144B may be constituted by Bézier curves. In particular, a protruding surface of the light-emitting surface 146B protrudes toward a direction away from the optical axis C (as shown by an arrow a' pointing a location on the light-emitting surface 146B), and both the back surface 142B at the two sides of the optical axis C and the second light-incident surface 144$b'$ of the cavity 144B are asymmetric surfaces. Besides, as indicated in FIG. 7B, the light-emitting surface 146B adjacent to the optical axis C protrudes toward a direction away from the tangent plane 142$t'$ (e.g., a location to which an arrow b' is directed), and the light-emitting surface 146B away from the optical axis C (e.g., a location to which an arrow c' is directed) is substantially a plane.

Figure 8:
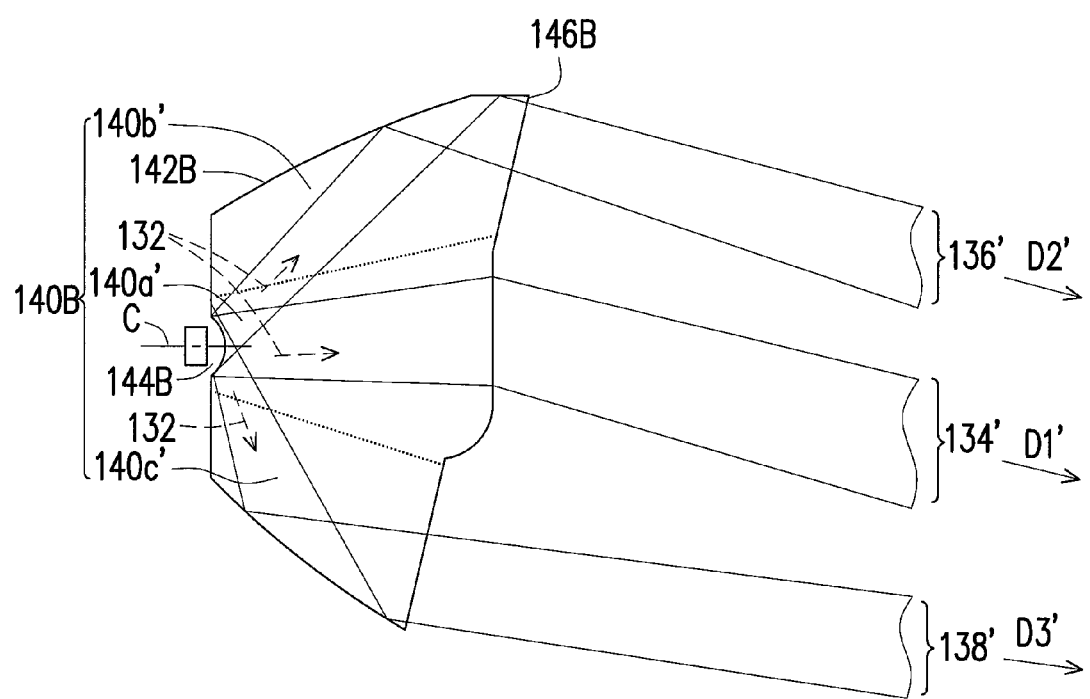
FIG. 8 is a schematic view illustrating light transmission within the lens depicted in FIG. 7A.

FIG. 8 is a schematic view illustrating light transmission within the lens 140B depicted in FIG. 7A. Referring to FIG. 8, the lens 140B of the present embodiment is collocated with the back surface 142B, the cavity 144B, and the light-emitting surface 146B by which the light 132 emitted from the light source 130 may be divided into a plurality of light beams 134', 136', and 138' with propagating directions D1'~D3'. The propagating directions D1'~D3' may be different. Herein, the light beams 134', 136', and 138' and the corresponding propagating directions D1'~D3' serve as an example for elaborating the present embodiment, which should however not be construed as a limitation to the invention.

Particularly, the lens 140 described in the present embodiment may include a first part 140$a'$, a second part 140$b'$, and a third part 140$c'$. In FIG. 8, dotted lines are applied to distinguish the first part 140$a'$, the second part 140$b'$, and the third part 140$c'$. As shown in FIG. 8, the first part 140$a'$ converges one portion of light 132 to provide the light beam 134'. The second part 140$b'$ reflects and converges another portion of light 132 to provide the light beam 136'. The third part 140$c'$ reflects and converges the other portion of light 132 to provide the light beam 138'. The light beam 134' is substantially transmitted along the propagating direction D1', the light beam 136' is substantially transmitted along the propagating direction D2', and the light beam 138' is substantially transmitted along the propagating direction D3'. According to the present embodiment, the propagating directions D1'~D3' are not substantially parallel to the optical axis C of the light source 130. Since the back surface 142B, the cavity 144B, and the light-emitting surface 146B are asymmetric surfaces constituted by Bézier curves, there may exist no tilt angle between the lens 140B and the side surface (e.g., the first and second side surfaces S3 and S4 shown in FIG. 5), and the lens 140B may divide the light 132 into a plurality of light beams 134', 136', and 138' and guide the light beams 134', 136', and 138' toward the normal direction through the bottom reflector 120 (shown in FIG. 5). That is, the optical axis C of the light source 130 of the backlight module 100B may be perpendicular to the side surface (e.g., the first and second side surfaces S3 and S4 shown in FIG. 5) of the chamber 110, and the backlight module 100B can still have favorable luminance in the normal direction. The arrangements, usage, and effects of other components in the backlight module 100B are similar to those in the backlight module 100A shown in FIG. 1B, and thus no further description is provided hereinafter.

Figure 9A:
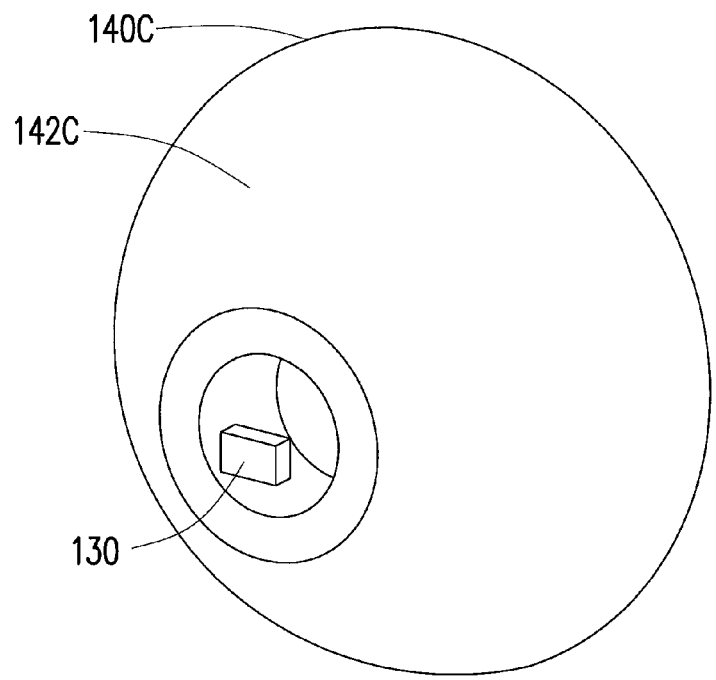
FIG. 9A is a partial enlarged view illustrating a light source and a lens according to another embodiment.
Figure 9B:
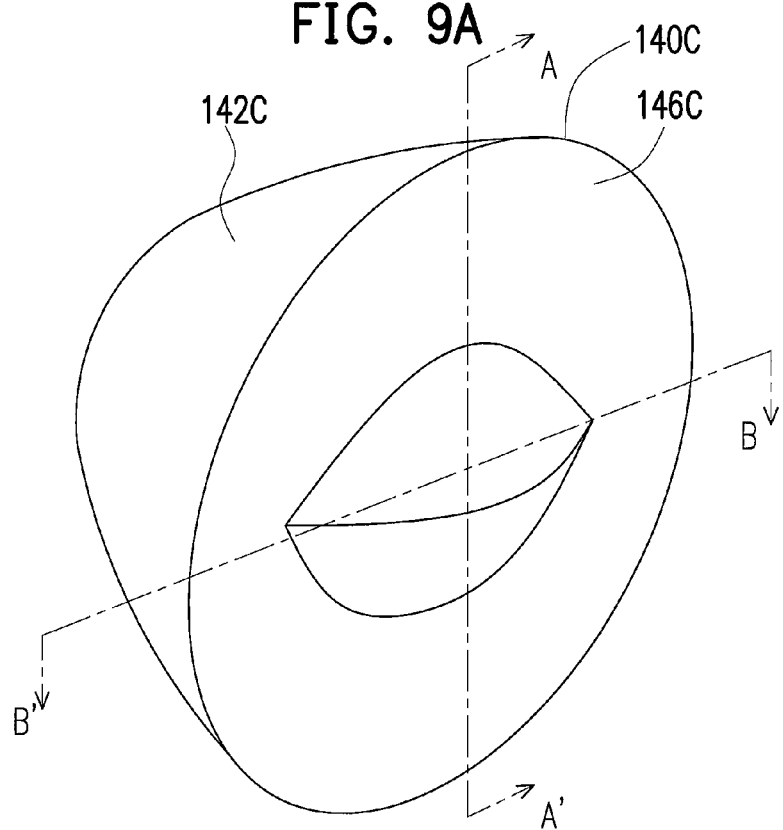
FIG. 9B is a partial enlarged view illustrating the lens depicted in FIG. 9A from another viewing angle.
Figure 10A:
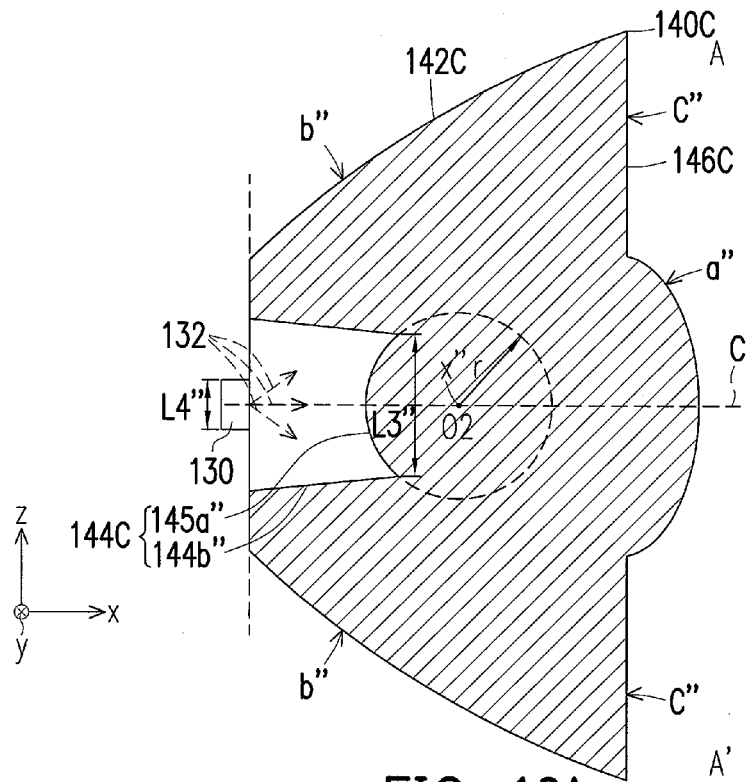
FIG. 10A is a schematic cross-sectional view taken along a section line A-A' depicted in FIG. 9B.
Figure 10B:
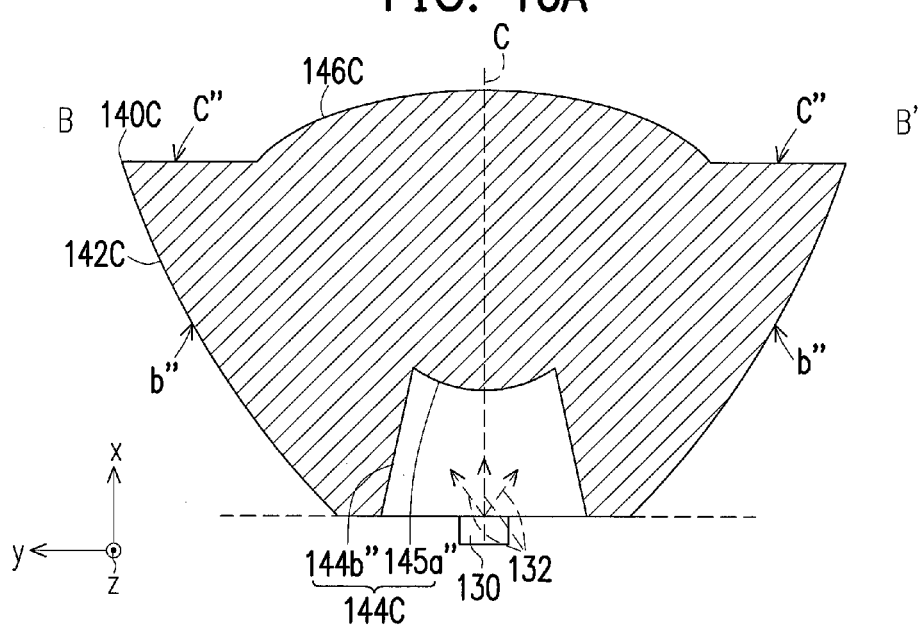
FIG. 10B is a schematic cross-sectional view taken along a section line B-B' depicted in FIG. 9B.

FIG. 9A is a partial enlarged view illustrating a light source 130 and a lens 140C according to another embodiment. FIG. 9B is a partial enlarged view illustrating the lens depicted in FIG. 9A from another viewing angle. FIG. 10A is a schematic cross-sectional view taken along a section line A-A' depicted in FIG. 9B. FIG. 10B is a schematic cross-sectional view taken along a section line B-B' depicted in FIG. 9B. Referring to FIG. 9A, FIG. 9B, FIG. 10A, and FIG. 10B, the lens 140C of the present embodiment is similar to the lens 140 depicted in FIG. 1A, while the difference therebetween lies in that the light-emitting surface 146C of the lens 140C, when observed from the optical axis C, may have a circular shape or an elliptic shape. The back surface 142C, the cavity 144C, and the light-emitting surface 146C of the lens 140C may be constituted by Bézier curves.

As shown in FIG. 9A, FIG. 9B, FIG. 10A, and FIG. 10B, the light-emitting surface 146C adjacent to the optical axis C is a protruding surface (shown by an arrow a'') constituted by Bézier curves, and the other light-emitting surfaces 146C (shown by an arrow C'') are planes. The back surface 142C and the light-emitting surface 146C are respectively symmetric surfaces. In addition, the cavity 144C may be constituted by the first light-incident surface 145a'' and the second light-incident surface 144b''. In the present embodiment, the first light-incident surface 145a'' may be a circular-spherical surface, and the second light-incident surface 144b'' may be an elliptic-conical surface. Particularly, an axis x'' of the circular-spherical surface and the optical axis C may be intersected at a point O2, and the circular-spherical surface has a curvature radius r that is greater than half the height L3'' of the cavity 144C. Herein, the height L3'' refers to the distance between the circular-spherical surface (the first light-incident surface 145a'') and the elliptic-conical surface (the second light-incident surface 144b'') that are intersected on the x-z plane. In the present embodiment, the height L3'' of the cavity 144C is approximately 2~3 times the height L4'' of the light source 130, the curvature radius r is approximately 1.6~2 times the height L4'' of the light source 130, and the height L4'' is the maximum length of the light source 130 along the z-axis. The axis (not shown) of the elliptic cone (the elliptic-conical surface, i.e., the second light-incident surface 144b'') is substantially located on the optical axis C. In the present embodiment, the lens 140C allows the light 132 emitted from the light source 130 to be divided into a plurality of light beams with different propagating directions, and the light beams may be guided by the lens 140C to the bottom reflector 120, so that the light beams may be guided by the bottom reflector 120 toward a normal direction of the light-emitting surface S1 (shown in FIG. 1B). In another embodiment, the first light-incident surface 145a'' and the second light-incident surface 144b'' may be constituted by Bézier curves as well. The arrangements, usage, and effects of other components in the backlight module 100B are similar to those in the backlight module 100A shown in FIG. 1B, and thus no further description is provided hereinafter.

Figure 11A:
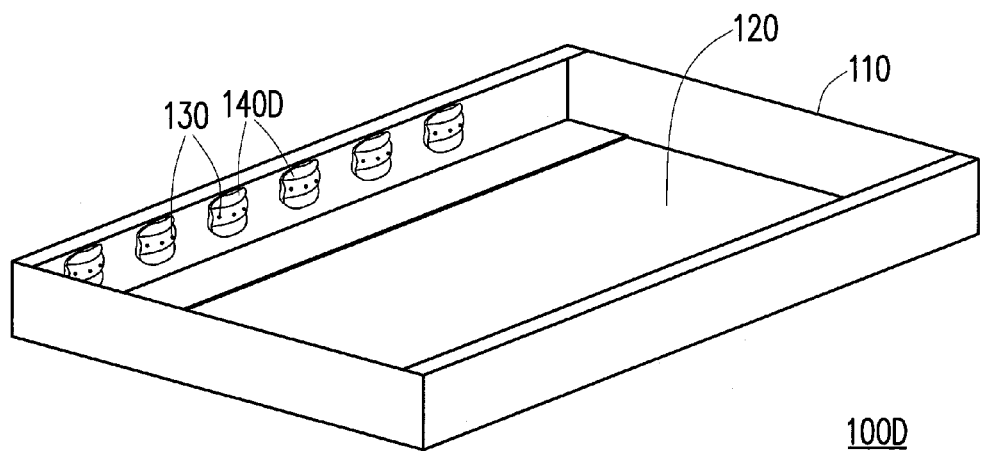
FIG. 11A is a schematic view illustrating a backlight module according to another embodiment of the invention.
Figure 11B:
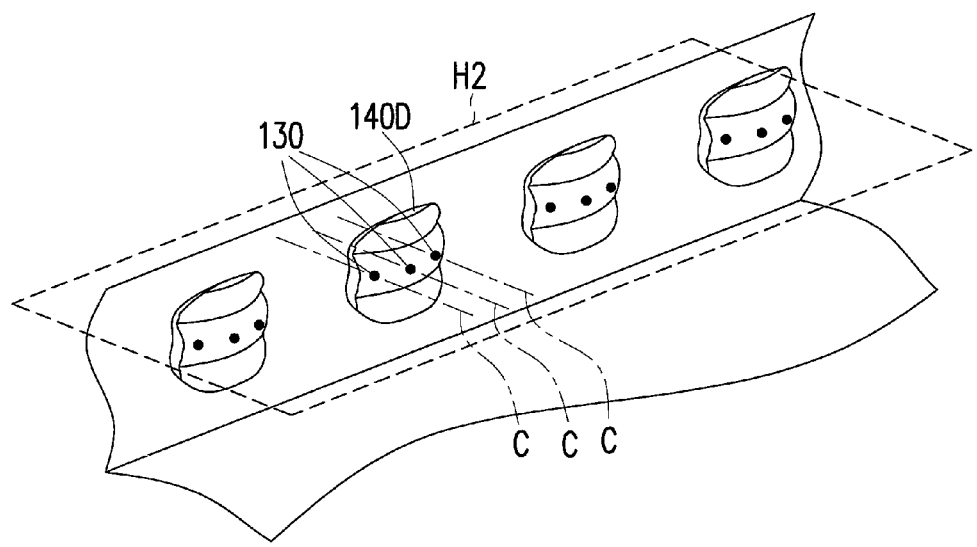
FIG. 11B is a partial enlarged view illustrating a backlight module according to another embodiment of the invention.
Figure 11C:
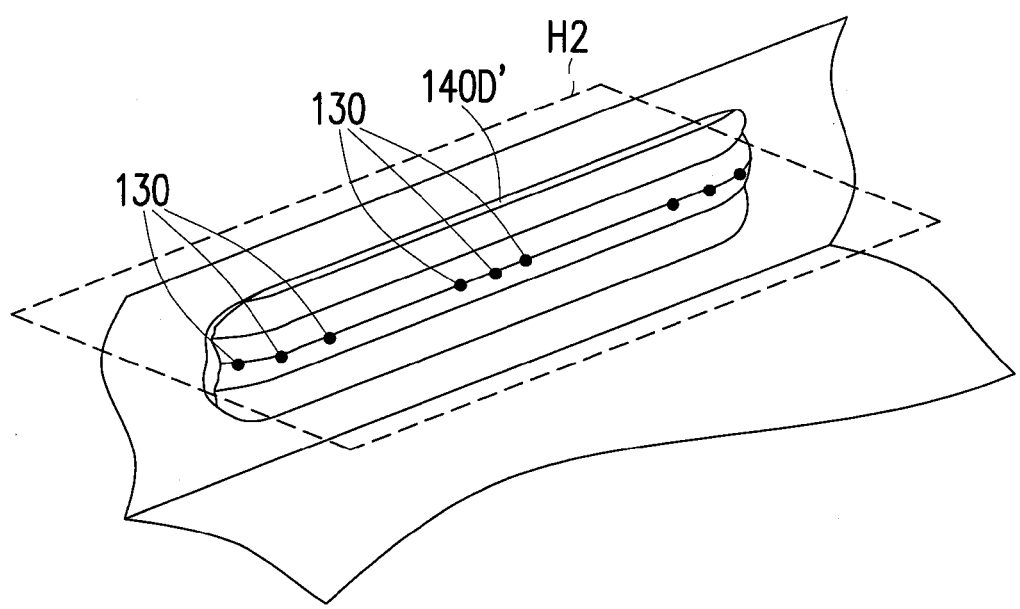
FIG. 11C is a partial enlarged view illustrating a backlight module according to another embodiment of the invention.

FIG. 11A is a schematic view illustrating a backlight module according to another embodiment of the invention. FIG. 11B is a partial enlarged view illustrating the backlight module depicted in FIG. 11A. Referring to FIG. 11A and FIG. 11B, the backlight module 100D of the present embodiment is similar to the backlight module 100A depicted in FIG. 1A, while the difference therebetween lies in that each lens 140D in the backlight module 100D of the present embodiment may correspond to plural light sources 130. To be more specific, the light axes C of the light sources 130 and the corresponding lenses 140D are located on the reference plane H2. The light provided by each light source 130 may be divided into a plurality of light beams with different propagating directions after passing the lens 140D, and parts of the propagating directions of the light beams are parallel to the reference plane H2. As shown in FIG. 11A, each lens 140D exemplarily corresponds to three light sources 130, while the number of light sources corresponding to each lens is not limited herein. A person with ordinary skills in the art may adjust the number of light sources 130 corresponding to each lens 140D in order to comply with design requirements of actual products. Alternatively, the lenses may be integrally formed to correspond to plural light sources (as shown by the lens 140D in FIG. 11C). The arrangements, usage, and effects of other components in the backlight module 100D are similar to those in the backlight module 100A shown in FIG. 1B, and thus no further description is provided hereinafter.

Figure 12A:
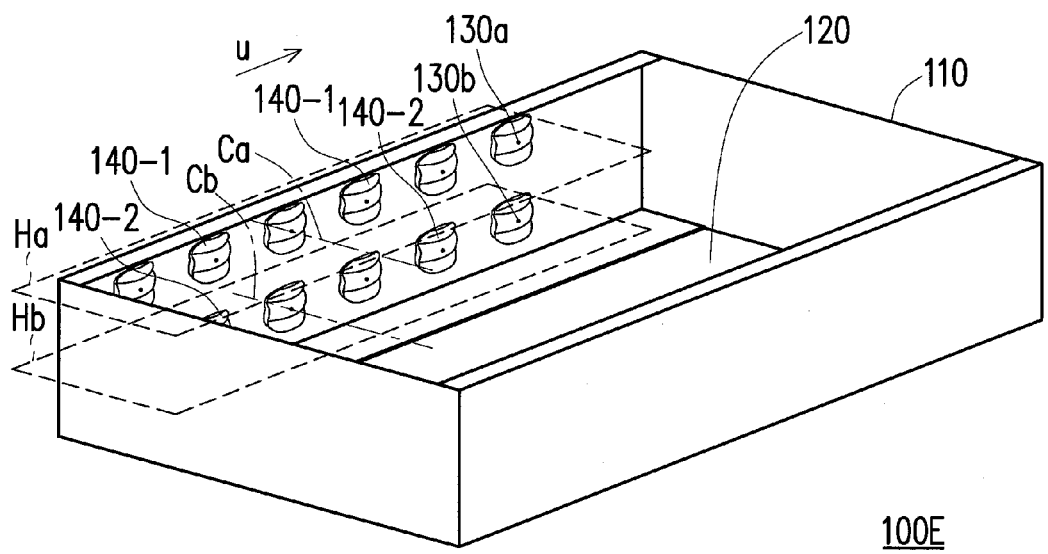
FIG. 12A is a schematic view illustrating a backlight module according to another embodiment of the invention.
Figure 12B:
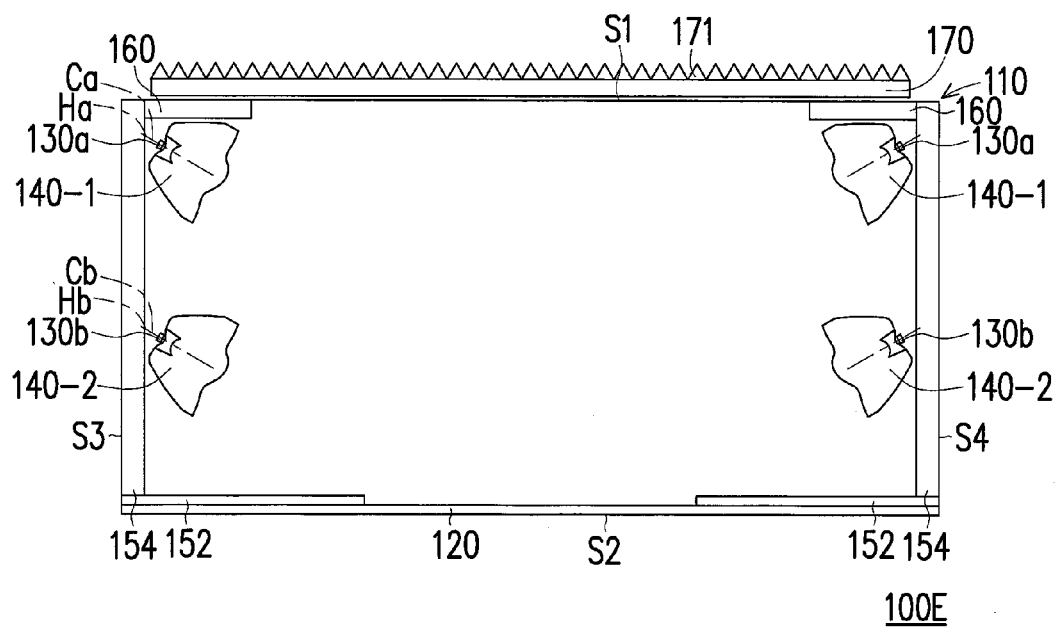
FIG. 12B is a schematic cross-sectional view illustrating the backlight module depicted in FIG. 12A.

FIG. 12A is a schematic view illustrating a backlight module according to another embodiment of the invention. FIG. 12B is a schematic cross-sectional view illustrating the backlight module depicted in FIG. 12A. Referring to FIG. 12A and FIG. 12B, the backlight module 100E described in the present embodiment is similar to the backlight module 100A depicted in FIG. 1A, while the difference therebetween lies in that the backlight module 100E in the present embodiment may have a plurality of light sources 130a and 130b and a plurality of lenses 140-1 and 140-2 on the first side surface S3 and the second surface S4 of the chamber 110 along a direction perpendicular to the bottom reflector 120 (i.e., along the height direction of the chamber 110). The light sources 130a and the corresponding lenses 140-1 are located above the light sources 130b and the corresponding lenses 140-2. The irradiation regions of the bottom reflector 120 where the lens 140-1 and the lens 140-2 irradiate are different but partially overlapped. In the present embodiment, the irradiation region of the bottom reflector 120 where the lens 140-1 irradiates is close to the center of the bottom reflector 120, and the irradiation region of the bottom reflector 120 where the lens 140-2 irradiates is close to the side surface. Namely, in comparison with the regions of the bottom reflector 120 where the lenses 140-2 on the first side surface S3 irradiate, the regions of the bottom reflector 120 where the lenses 140-1 on the first side surface S3 irradiate are farther away from the first side surface S3; in comparison with the regions of the bottom reflector 120 where the lenses 140-2 on the second side surface S4 irradiate, the regions of the bottom reflector 120 where the lenses 140-1 on the second side surface S4 irradiate are farther away from the second side surface S4. Thereby, the luminance of the backlight module 100E in the normal direction and the light-emitting uniformity of the backlight module 100E can be effectively controlled. Besides, the plurality of the light sources 130a and 130b are respectively arranged along a direction u, and each lens 140 is located on the optical axis Ca of the light sources 130a and the optical axis Cb of the light sources 130b, respectively. In other words, the optical axis Ca of the light sources 130a and the corresponding lenses 140-1 are located on the reference plane Ha, and the optical axis Cb of the light sources 130b and the corresponding lenses 140-2 are located on the reference plane Hb. As such, the light emitted from each light source 130a and 130b can irradiate the bottom reflector 120 and can be evenly reflected toward the normal direction, so that the backlight module 100E may have satisfactory light-emitting uniformity and favorable luminance in the normal direction. In the embodiment shown in FIG. 12A, the lenses 140-1 and 140-2 may be the same type of lenses or different types of lenses. If the lenses 140-1 and 140-2 are different types of lenses, the back surface and the light-emitting surface of each lens 140-1 may be symmetric surfaces (as shown in FIG. 9A and FIG. 10A); the back surface 142B of each lens 140-2 at two sides of the optical axis C may have an asymmetric structure (as shown in FIG. 6A and FIG. 7A), i.e., the back surface 142B located at the upper side of the optical axis C has a length greater than that of the back surface 142B located at the lower side of the optical axis C. The arrangements, usage, and effects of other components in the backlight module 100E are similar to those in the backlight module 100A shown in FIG. 1B, and thus no further description is provided hereinafter.

Figure 13A:
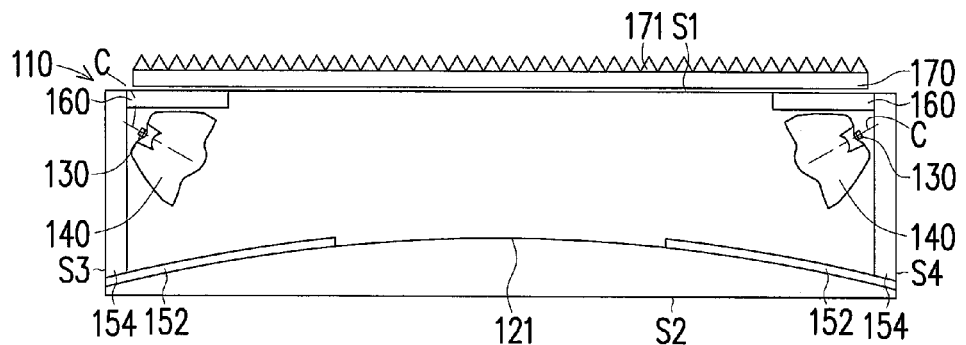
FIG. 13A is a schematic cross-sectional view illustrating a backlight module according to another embodiment of the invention.
Figure 13B:
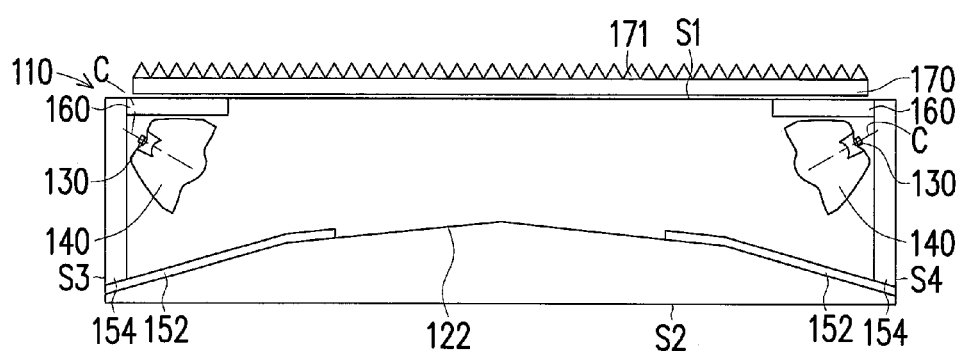
FIG. 13B is a schematic cross-sectional view illustrating a backlight module according to another embodiment of the invention.
Figure 13C:
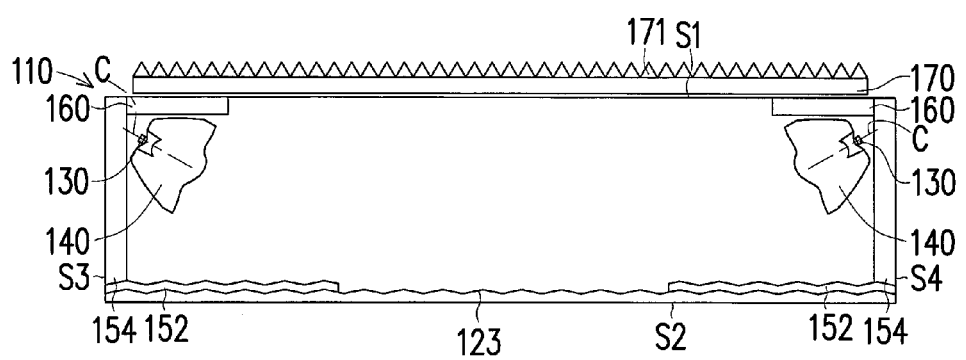
FIG. 13C is a schematic cross-sectional view illustrating a backlight module according to another embodiment of the invention.

FIG. 13A is a schematic cross-sectional view illustrating a backlight module according to another embodiment of the invention. Referring to FIG. 13A, the backlight module 100F described in the present embodiment is similar to the backlight module 100A depicted in FIG. 1B, while the difference therebetween lies in that the bottom reflector 121 of the backlight module 100E in the present embodiment has a curved surface constituted by a circular curved surface or a parabolic surface, for instance. A curvature radius of the bottom reflector 121 at the center of the chamber 110 is less than a curvature radius of the bottom reflector 121 away from the center of the chamber 110, or the surface of the bottom reflector 121 away from the center of the chamber 110 tends to be a plane. According to the present embodiment, the bottom reflector 121 allows the light 132 to be guided toward the normal direction in an effective manner, and the light-emitting efficiency of the light 132 in the normal direction can be enhanced. Through adjustment of the curvature radius of the bottom reflector 121, the backlight module 100F is capable of providing favorable luminance in the normal direction. Certainly, the surface of the bottom reflector 121 may be constituted by a plurality of spliced planes, and different tilt angles exist between the bottom surface S2 and these spliced planes. The backlight module 100G depicted in FIG. 13B and the backlight module 100H depicted in FIG. 13C are taken for example. Herein, the bottom reflector 123 of the backlight module 100H may have a surface constituted by one or plural planes. Similarly, the bottom reflector 122 of the backlight module 100G allows the light 132 to be guided toward the normal direction in an effective manner. As a result, the backlight modules 100F, 100G, and 100H can all have favorable luminance in the normal direction. According to other embodiments as exemplarily shown in FIG. 13A and FIG. 13B, the thickness of the bottom reflector 121 or 122 at the center of the chamber is greater than the thickness of the bottom reflector 121 or 122 away from the center of the chamber.

Figure 13D:
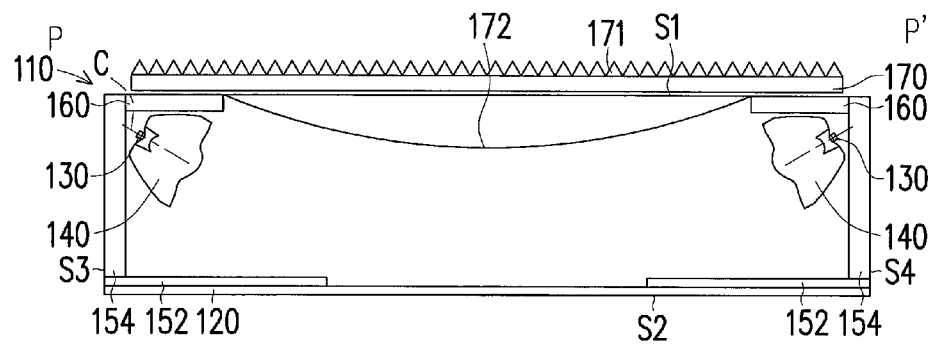
FIG. 13D is a schematic cross-sectional view illustrating a backlight module according to another embodiment of the invention.

Additionally, diffusion boards or diffusion sheets may be further configured in the chamber 110. FIG. 13D is a schematic cross-sectional view illustrating a backlight module according to another embodiment of the invention. Referring to FIG. 13D, the backlight module 100I of the present embodiment is similar to the backlight module 100A depicted in FIG. 1B, while the difference therebetween lies in that a diffusion sheet 172 is configured on the light-emitting surface S1 of the chamber 110 in the backlight module 100I described in the present embodiment, and the diffusion sheet 172 is located between the bottom reflector 120 and the diffusion sheet 170. Herein, the diffusion sheet 172 has a curved surface protruding toward the center of the chamber 110. Particularly, a curvature radius of the diffusion sheet 172 at the center of the chamber 110 is less than a curvature radius of the diffusion sheet 172 away from the center of the chamber 110, or the surface of the diffusion sheet 172 away from the center of the chamber 110 tends to be a plane. Thereby, after light transmitted along a direction not parallel to the normal direction (not shown) of the light-emitting surface S1 enters the diffusion sheet 172, the traveling direction of the light can be changed, so as to improve the light-emitting efficiency of the backlight module 100I in the normal direction.

Figure 13E:
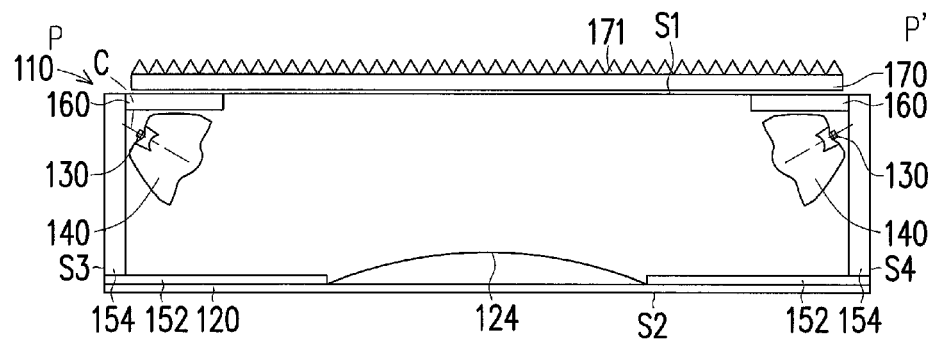
FIG. 13E is a schematic cross-sectional view illustrating a backlight module according to another embodiment of the invention.

As shown in FIG. 13E, the diffusion sheet 124 is configured on the bottom reflector 120 in the backlight module 100J described in the present embodiment. The diffusion sheet 124 has a curved surface protruding toward the center of the chamber 110. A curvature radius of the diffusion sheet 124 at the center of the chamber 110 is less than a curvature radius of the diffusion sheet 124 away from the center of the chamber 110, or the surface of the diffusion sheet 124 away from the center of the chamber 110 tends to be a plane. Thereby, the diffusion sheet 124 may allow the light to be evenly guided toward the normal direction. Certainly, in the present embodiment, the diffusion sheet 124 may be selectively disposed on the bottom reflector 120, or the diffusion sheet 172 may be selectively disposed on the light-emitting surface S1. As such, the backlight module 100I or 100J may have satisfactory light-emitting uniformity and favorable luminance in the normal direction.

To sum up, in the backlight module described in the embodiments of the invention, the bottom reflector is disposed inside the chamber, and the lenses are configured on the transmission path of light emitted from the light sources. Due to the lenses and the bottom reflector, the light provided by each light source may be divided into a plurality of light beams with different propagating directions after passing the corresponding lens, and the bottom reflector may then guide the light beams toward the normal direction. Thereby, the backlight module is capable of providing uniform luminance in a normal direction.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to people have ordinary skills in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module comprising:
   a chamber having a bottom surface and a side surface;
   a bottom reflector disposed inside the chamber and located on the bottom surface;
   a plurality of light sources disposed inside the chamber and located above the bottom reflector, the light sources being adjacent to the side surface, each of the light sources being suitable for providing light; and
   a plurality of lenses disposed on a transmission path of the light, each of the lenses having a back surface, a cavity on the back surface, and a light-emitting surface, the cavity having a light-incident surface, each of the light sources being arranged corresponding to one of the lenses and adjacent to the cavity, wherein the light is divided into a plurality of light beams with different propagating directions after the light passes the corresponding lens, and all the light beams irradiate the bottom reflector.

2. The backlight module as recited in claim 1, wherein parts of the propagating directions are parallel to an optical axis of the light sources, and the other of the propagating directions are not parallel to the optical axis of the light.

3. The backlight module as recited in claim 1, wherein each of the lenses respectively corresponds to more than one of the light sources.

4. The backlight module as recited in claim 1, wherein each of the lenses respectively corresponds to one of the light sources.

5. The backlight module as recited in claim 1, wherein a plurality of irradiation regions on the bottom reflector are irradiated by the light beams with the different propagating directions, and the irradiation regions are overlapped.

6. The backlight module as recited in claim 1, an optical axis of each of the light sources being located on a reference plane, wherein parts of the propagating directions are parallel to the reference plane and the other of the propagating directions are not parallel to the reference plane after the light emitted from each of the light sources passes the lenses.

7. The backlight module as recited in claim 1, wherein each of the lenses comprises a first part and a second part, the first part converges one portion of the light to provide one of the light beams, and the second part reflects and converges the other portion of the light to provide the other light beams.

8. The backlight module as recited in claim 1, wherein each of the lenses comprises a first part, a second part, and a third part, the first part converges one portion of the light to provide a first light beam of the light beams, the second part reflects and converges another portion of the light to provide a second light beam of the light beams, and the third art reflects and converges the other portion of the light to provide a third light beam of the light beams.

9. The backlight module as recited in claim 1, wherein the light beams irradiate the bottom reflector in a tilted manner.

10. The backlight module as recited in claim 9, wherein a thickness of the bottom reflector at a center of the chamber is greater than a thickness of the bottom reflector away from the center of the chamber.

11. The backlight module as recited in claim 10, wherein the bottom reflector has a curved surface, and a curvature radius of the curved surface at the center of the chamber is less than a curvature radius of the curved surface away from the center of the chamber.

12. The backlight module as recited in claim 9, wherein a tilt angle is between the side surface and each of the lenses respectively corresponding to one of the light sources.

13. The backlight module as recited in claim 12, wherein the tilt angle is approximately $\tan^{-1}(h_0/w_0)$, the chamber has a height and a width, $h_0$ is the height of the chamber, and $w_0$ is half of the width of the chamber.

14. The backlight module as recited in claim 12, wherein a first row of the light sources and a second row of the light sources are configured on the side surface along a height direction of the chamber, and the first row of the light sources is located above the second row of the light sources.

15. The backlight module as recited in claim 14, wherein the first row of the light sources and the second row of the light sources respectively irradiate irradiation regions of the bottom reflector, and the irradiation region where the first row of the light sources irradiates is farther away from the side surface than the irradiation region where the second row of the light sources irradiates.

16. The backlight module as recited in claim 14, wherein the lenses corresponding to the first row of the light sources are different from the lenses corresponding to the second row of the light sources.

17. The backlight module as recited in claim 16, wherein the first row of the light sources has a first optical axis, the second row of the light sources has a second optical axis, the back surface of each of the lenses corresponding to the first row of the light sources and the light-emitting surface are symmetrical with respect to the first optical axis, and the back surface of each of the lenses corresponding to the second row of the light sources and the light-emitting surface are not symmetrical with respect to the second optical axis.

18. The backlight module as recited in claim 1, further comprising a side reflector, wherein an edge of the side reflector and an edge of the bottom reflector are adjoined to surround the light sources and the lenses.

19. The backlight module as recited in claim 18, wherein the side reflector is a mirror reflector.

20. The backlight module as recited in claim 1, further comprising a top reflector disposed above the bottom reflector to cover the light sources and the lenses, wherein the top reflector defines a light-emitting opening.

21. The backlight module as recited in claim 1, further comprising a diffusion sheet disposed over the bottom reflector.

22. The backlight module as recited in claim 21, wherein the diffusion sheet comprises a curved surface protruding toward the chamber.

23. The backlight module as recited in claim 21, wherein the chamber has a light-emitting surface opposite to the bottom surface, and the diffusion sheet is disposed adjacent to the light-emitting surface of the chamber.

24. The backlight module as recited in claim 21, wherein the diffusion sheet is disposed over the bottom surface and located on the bottom reflector.

* * * * *